United States Patent
Nomura

(10) Patent No.: US 9,639,313 B2
(45) Date of Patent: May 2, 2017

(54) JOB CONTROL DEVICE THAT ENSURES FACILITATED REPERFORMANCE OF CANCELED JOB, JOB CONTROL METHOD, AND RECORDING MEDIUM

(71) Applicant: KYOCERA Document Solutions Inc., Osaka (JP)

(72) Inventor: Kazuma Nomura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/018,324

(22) Filed: Feb. 8, 2016

(65) Prior Publication Data

US 2016/0253139 A1    Sep. 1, 2016

(30) Foreign Application Priority Data

Feb. 26, 2015  (JP) .................................. 2015-036073

(51) Int. Cl.
  *G06F 3/12* (2006.01)
  *H04N 1/00* (2006.01)
  *H04N 1/44* (2006.01)

(52) U.S. Cl.
  CPC .......... *G06F 3/1274* (2013.01); *G06F 3/1205* (2013.01); *G06F 3/126* (2013.01); *G06F 3/1259* (2013.01); *G06F 3/1285* (2013.01); *H04N 1/00411* (2013.01); *H04N 1/00896* (2013.01); *H04N 1/4413* (2013.01); *H04N 2201/0094* (2013.01)

(58) Field of Classification Search
  USPC ........................................................ 358/1.13
  See application file for complete search history.

(56) References Cited

U.S. PATENT DOCUMENTS 7,706,003 B2   4/2010   Uruma ......................... 358/1.14
8,964,204 B2   2/2015   Ogasawara .................. 358/1.14
(Continued)

FOREIGN PATENT DOCUMENTS

JP   2003-125184 A   4/2003
JP   2004-086766 A   3/2004
(Continued)

OTHER PUBLICATIONS

Ueda Akio; Image Forming Apparatus and Job Management Method; Feb. 2, 2006; Machine Translated Japanese Patent Application Publication; JP2004-206856 (listed on IDS); All Pages.*

*Primary Examiner* — Ngon Nguyen
(74) *Attorney, Agent, or Firm* — Stein IP, LLC

(57) ABSTRACT

A job control device includes a display, a storage circuit, an execution circuit, a status display, a cancel circuit, a recovery display, and a recovery control circuit. The execution circuit performs a job. The recovery display displays a second operation screen on the display. The second operation screen includes a selection display field and a second input portion. The selection display field selectably displays the cancel jobs stored in the storage circuit. The second input portion is configured to receive a recovery instruction for performing the cancel job selected in the selection display field again. The recovery control circuit causes the execution circuit to perform the cancel job corresponding to the recovery instruction when the recovery instruction is input.

11 Claims, 9 Drawing Sheets

(56) References Cited

U.S. PATENT DOCUMENTS

| | | |
|---|---|---|
| 9,335,962 B2 | 5/2016 | Konita et al. |
| 2006/0028661 A1* | 2/2006 | Uruma ............... H04N 1/00408 358/1.6 |
| 2008/0013123 A1* | 1/2008 | Yoshioka ........... G03G 15/5012 358/1.15 |
| 2009/0027722 A1* | 1/2009 | Tsujimoto .......... H04N 1/00222 358/1.15 |
| 2013/0208292 A1* | 8/2013 | Akari ..................... G06F 3/121 358/1.13 |

FOREIGN PATENT DOCUMENTS

| | | |
|---|---|---|
| JP | 2006-26992 A | 2/2006 |
| JP | 2008-18622 A | 1/2008 |
| JP | 2012-20432 A | 2/2012 |
| JP | 2013-031101 A | 2/2013 |

* cited by examiner

FIG. 3

| Job No. | Accepted Time | Cancel Job ||||||
|---|---|---|---|---|---|---|---|
| | | Type | User Name | Job Name | Execution Condition ||| Process Information |
| | | | | | Copies | ... | Image Data | |
| 000021 | 10:31 | Copy Job | userA | 20150210103050 | 5 | ... | — | 2/5 Printed |
| 000032 | 15:31 | Scan Job | userB | 20150210153050 | — | ... | — | Scan |
| 000043 | 17:00 | Print Job | userA | doc1.txt | 2 | ... | Binary Data | 0/2 Printed |

JT

JOB CONTROL DEVICE THAT ENSURES FACILITATED REPERFORMANCE OF CANCELED JOB, JOB CONTROL METHOD, AND RECORDING MEDIUM

INCORPORATION BY REFERENCE

This application is based upon, and claims the benefit of priority from, corresponding Japanese Patent Application No. 2015-036073 filed in the Japan Patent Office on Feb. 26, 2015, the entire contents of which are incorporated herein by reference.

BACKGROUND

Unless otherwise indicated herein, the description in this section is not prior art to the claims in this application and is not admitted to be prior art by inclusion in this section.

The following technique has been known. An image forming apparatus, such as a printer and a copying machine, displays jobs in execution and uncompleted jobs in a list in a screen. The image forming apparatus cancels execution of a job selected from these jobs displayed in the list.

For example, the following technique has been proposed. In response to pressing of a stop/clear key or a similar key, the job in execution is temporary halted. A job list screen displays these temporary halted job and jobs in standby in a list. The following technique has been proposed. When inputting a cancel instruction, which cancels execution of a job selected from these jobs displayed in the list, the technique causes a user to select whether to cancel the job or not. When selecting the cancel of the job, the technique cancels the execution of this selected job.

The following technique has been proposed. Upon accepting an abort instruction of a print job, when there is a plurality of print jobs where printing has not been completed yet, a confirmation screen displays these plurality of print jobs in a list. The technique aborts execution of a print job selected from these print jobs displayed in the list.

SUMMARY

A job control device according to one aspect of the disclosure includes a display, a storage circuit, an execution circuit, a status display, a cancel circuit, a recovery display, and a recovery control circuit. The execution circuit performs a job. The status display displays a first operation screen on the display. The first operation screen includes a first display field and a first input portion. The first display field displays an execution status of the job in execution by the execution circuit. The first input portion is configured to receive a cancel instruction for canceling the execution of the job. The cancel circuit stores the job corresponding to the cancel instruction in the storage circuit as a cancel job and cancels the execution of the job by the execution circuit when the cancel instruction is input. The recovery display displays a second operation screen on the display. The second operation screen includes a selection display field and a second input portion. The selection display field selectably displays the cancel jobs stored in the storage circuit. The second input portion is configured to receive a recovery instruction for performing the cancel job selected in the selection display field again. The recovery control circuit causes the execution circuit to perform the cancel job corresponding to the recovery instruction when the recovery instruction is input.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3 illustrates an example of cancel jobs stored in a storage unit;

DETAILED DESCRIPTION

Figure 1:
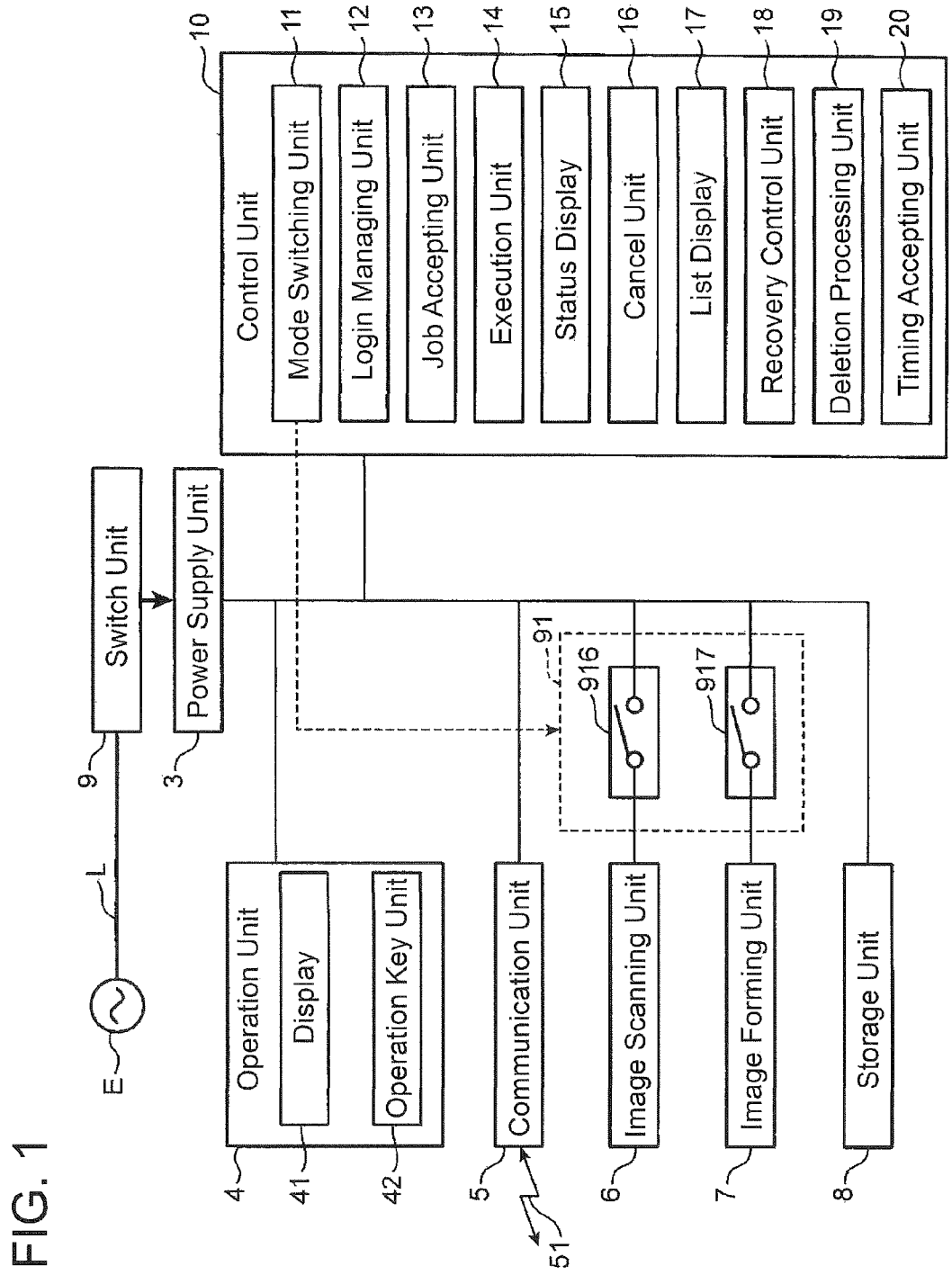
FIG. 1 illustrates an electrical configuration of a multi-functional peripheral of a job control device according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of a job control device according to the disclosure based on the drawings. This embodiment gives the description with an example of a multi-functional peripheral as the job control device. However, this does not limit the gist. The job control device may also be, for example, an image forming apparatus, such as a facsimile device, a copying machine, or a printer, and an electronic device, such as an information processing server, which performs predetermined jobs.

FIG. 1 illustrates an electrical configuration of a multi-functional peripheral 1 of a job control device according to one embodiment of the disclosure. As illustrated in FIG. 1, the multi-functional peripheral 1 includes a switch unit 9, a power supply unit 3, an operation unit 4, a communication unit 5, a switching unit 91, an image scanning unit 6, an image forming unit 7 (which is also referred to as image output unit), a storage unit 8, and a control unit 10. The storage unit 8 is also referred to as a storage circuit.

The switch unit 9 switches a supply and cutoff of electric power, which is supplied from an external power supply E, such as a commercial power supply, to the multi-functional peripheral 1. The switch unit 9 is a switch that switches a state between an on-state (a closed state) and an off-state (an open state) by the user's operation. When the user operates the switch unit 9 for switching to the on-state, the electric power supplied from the external power supply E is supplied to the power supply unit 3 via a power supply cable L. When the user operates the switch unit 9 for switching to the off-state, the external power supply E cuts off the supply of the electric power to the power supply unit 3.

The power supply unit 3 converts the electric power supplied from the external power supply E into a power supply voltage at a predetermined level, which is used to operate the respective units in the multi-functional peripheral 1, using an AC/DC converter (not illustrated) or a similar device.

The switching unit 91 includes two switches 916 and 917. Under control by a mode switching unit 11, which will be described later, the switches 916 and 917 are turned on and off (opened and closed).

When the switch 916 is turned off (the open state), the power supply unit 3 cuts off the supply of the power supply voltage to the image scanning unit 6. When the switch 916 is turned on (the closed state), the power supply unit 3 supplies the power supply voltage to the image scanning unit 6. Similarly, when the switch 917 is turned off, the power supply unit 3 cuts off the supply of the power supply voltage to the image forming unit 7. When the switch 917 is turned on, the power supply unit 3 supplies the power supply voltage to the image forming unit 7. To the operation unit 4, the communication unit 5, the storage unit 8, and the control unit 10, the power supply unit 3 supplies the power supply voltage without via switches.

The operation unit 4 includes a display 41 and an operation key unit 42. The display 41 with a touch panel function, such as a liquid crystal display, displays information and ensures a touch operation. With the operation key unit 42, the user performs various operations.

The communication unit 5 is connected to a network 51. The communication unit 5 transmits and receives various data with an external device, such as a personal computer, connected to the network 51.

For example, the communication unit 5 receives data indicative of a job, such as a print job, which will be described later, input by the user to the external device via the network 51. The communication unit 5 outputs this received data to the control unit 10. The following abbreviates the data indicative of the job simply as a job. The details of the job will be described later. The communication unit 5, for example, transmits image data created by execution of a scan job, which will be described later, to the external device via the network 51.

The image scanning unit 6 includes an optical system unit (not illustrated) that has a Charge Coupled Device (CCD) line sensor, an exposing lamp, or a similar sensor. Under control by the control unit 10, the image scanning unit 6 performs a scanning process. The scanning process is a process that causes the optical system unit to scan images on documents and outputs image data, which represents the images on the documents.

Under control by the control unit 10, the image forming unit 7 performs a print process. The print process is a process that forms (outputs) the image represented by the image data input from the control unit 10 to a paper sheet. Specifically, the image forming unit 7 has the well-known configuration that includes a photoreceptor drum, a charging unit, an exposure unit, a developing unit, a cleaning unit, or a similar unit. The charging units are sequentially arrayed opposed to the photoreceptor drums.

The storage unit 8 is a storage device such as a Hard Disk Drive (HDD) and a Solid State Drive (SSD). The storage unit 8 preliminary stores various data required for the multi-functional peripheral 1 to operate, such as authentication data, which will be described later, used by the user for login to the multi-functional peripheral 1. When the control unit 10 executes the job, data used for respective processes, which constitute this job, is scanned from/written to the storage unit 8.

The control unit 10 includes, for example, a Central Processing Unit (CPU) (not illustrated) for executing a predetermined arithmetic operation, a non-volatile memory (not illustrated) such as an Electrically Erasable and Programmable Read Only Memory (EEPROM) storing a predetermined control program, a Random Access Memory (RAM) (not illustrated) for temporarily storing data, and a peripheral circuit of these elements. The control unit 10 controls operations of each unit in the multi-functional peripheral 1 by causing the CPU to run the control program stored in the non-volatile memory or a similar memory.

The control unit 10, for example, operates as the mode switching unit 11, a login managing unit 12, a job accepting unit 13, an execution unit 14, a status display 15, a cancel unit 16, a list display 17 (also referred to as a recovery display), a recovery control unit 18, a deletion processing unit 19, and a timing accepting unit 20. The mode switching unit 11 is also referred to as a mode switching circuit. The login managing unit 12 is also referred to as a login managing circuit. The job accepting unit 13 is also referred to as a job accepting circuit. The execution unit 14 is also referred to as an execution circuit. The cancel unit 16 is also referred to as a cancel circuit. The recovery control unit 18 is also referred to as a recovery control circuit. The deletion processing unit 19 is also referred to as a deletion processing circuit. The timing accepting unit 20 is also referred to as a timing accepting circuit.

The mode switching unit 11 switches an electric power mode between a sleep mode and a normal mode. The sleep mode restrains power consumption by the multi-functional peripheral 1. The normal mode does not restrain the power consumption.

Specifically, during the initial operation of the multi-functional peripheral 1 and when an operation using the operation unit 4 is performed in the sleep mode of the electric power mode, the mode switching unit 11 switches the electric power mode to the normal mode. To switch the electric power mode to the normal mode, the mode switching unit 11 turns on the switches 916 and 917. Thus, the mode switching unit 11 causes the power supply unit 3 to supply the power supply voltage to the image scanning unit 6 and the image forming unit 7. This does not restrain the power consumptions by the image scanning unit 6 and the image forming unit 7.

Meanwhile, when the operation using the operation unit 4 is not performed in the normal mode of the electric power mode within a predetermined time limit, the mode switching unit 11 switches the electric power mode to the sleep mode. To switch the electric power mode to the sleep mode, the mode switching unit 11 turns off the switches 916 and 917. Thus, the mode switching unit 11 cuts off the supply of power supply voltage from the power supply unit 3 to the image scanning unit 6 and the image forming unit 7. This restrains the power consumption by the image scanning unit 6 and the image forming unit 7.

The login managing unit 12 permits the user to log in to the multi-functional peripheral 1. The login managing unit 12 causes the user who logs in to the multi-functional peripheral 1 (hereinafter referred to as a login user) to log out from the multi-functional peripheral 1.

Specifically, the login managing unit 12 displays a login screen (not illustrated) on the display 41. When a user name and a password input to the login screen by the user match a user name and a password for authentication, which are preliminary stored in the storage unit 8, the login managing unit 12 permits this user to log in to the multi-functional peripheral 1. Meanwhile, when the login user exists, by performing a touch operation on a logout button (not illustrated), which is displayed in the display 41, the login managing unit 12 causes this login user to log out from the multi-functional peripheral 1. The methods for login and logout of the user by the login managing unit 12 are not limited to this, but the other well-known methods may be applied.

The job accepting unit 13 accepts inputs of jobs executable by the multi-functional peripheral 1. Specifically, when the user inputs the job to a setting screen for job or when the communication unit 5 inputs the job received from the external device to the control unit 10, the job accepting unit 13 accepts the input of this job. When the job accepting unit 13 accepts the job, the job accepting unit 13 makes a job number, which is to identify this job, an accepted time of this job, and this job correspond to one another and stores them in the storage unit 8.

The jobs executable by the multi-functional peripheral 1 include a print job (an image output job), a scan job, a copy job, or a similar job. Each job includes the type of job, the user name of the user who has input this job, a job name to identify this job, data indicative of an execution condition of this job (hereinafter abbreviated as an execution condition), or similar information.

The print job is a job that causes the image forming unit 7 to perform the print process. The print job includes the type of job, "Print Job," and the user name of the user who has input this print job. The print job also includes a file name of an electronic file as the job name. The electronic file is formed of image data representing a target image formed (output) on a paper sheet by the print process. The print job also includes the image data, the number of copies of paper sheets to be output, or similar information as the execution conditions used to perform the print process. The image data represents a target image formed on the paper sheet.

A scan job is a job that causes the image scanning unit 6 to perform the scanning process. The scan job includes the type of job, "Scan Job," and the user name of the user who has input this scan job. The scan job also includes a date and time when the input of this scan job is terminated as the job name. For example, the scan job whose input has terminated at YYYY (year) MM (month) DD (day) HH (hour) MI (minute) SS (second) includes the job name "YYYYMMD-DHHMISS." The scan job includes the output destination for the image data, information whether to convert the image data to be output into an electronic file or not, the file name of the electronic file when the image data to be output is converted into the electronic file, or a similar condition as the execution conditions used to perform the scanning process.

The copy job is a job that causes the image scanning unit 6 to perform the scanning process. After that, continuously, the copy job causes the image forming unit 7 to perform the print process using the image data output by this scanning process. The copy job includes the type of job, "Copy Job," and the user name of the user who has input this copy job. The copy job also includes a date and time when the input of this copy job is terminated as the job name, similar to the scan job. The copy job also includes information that decides the output destination for the image data as the control unit 10, information that defines the image data to be output being not converted into the electronic file, or similar information as the execution conditions used to perform the scanning process. The copy job includes the number of copies of the paper sheets to be output, a print density for forming images on the paper sheets, or a similar condition as the execution conditions used to perform the print process.

The execution unit 14 sequentially performs the jobs accepted by the job accepting unit 13.

For example, when performing a print job that includes the number of copies of the paper sheets to be output, "5," as the execution condition, the execution unit 14 causes the image forming unit 7 to perform the print process five times consecutively. The print process forms the images represented by the image data included in the output condition on the paper sheets.

Assume that the execution unit 14 performs the scan job that includes the IP address of the external device, "XX.XX.XX.XX," as the output destination for image data, "Convert image data into electronic file," which indicates the conversion of the image data to be output into electronic file, and the file name, "doc1.txt," as the execution conditions.

In this case, the execution unit 14 causes the image scanning unit 6 to perform the scanning process. The execution unit 14 converts the image data output by this scanning process into electronic file. The execution unit 14 names the file name of this electronic file as the file name included in the execution conditions for this scan job, "doc1.txt." The execution unit 14 causes the communication unit 5 to transmit this electronic file to the external device indicated by the IP address, "XX.XX.XX.XX," which is included in the execution conditions for this scan job.

To perform the copy job that includes the number of copies of the paper sheets to be output, "5," as the execution condition, the execution unit 14, for example, causes the image scanning unit 6 to perform the scanning process. After that, continuously, the execution unit 14 causes the image forming unit 7 to perform the print process five consecutive times. The print process forms the images represented by the image data output by this scanning process on the paper sheets.

Figure 2:
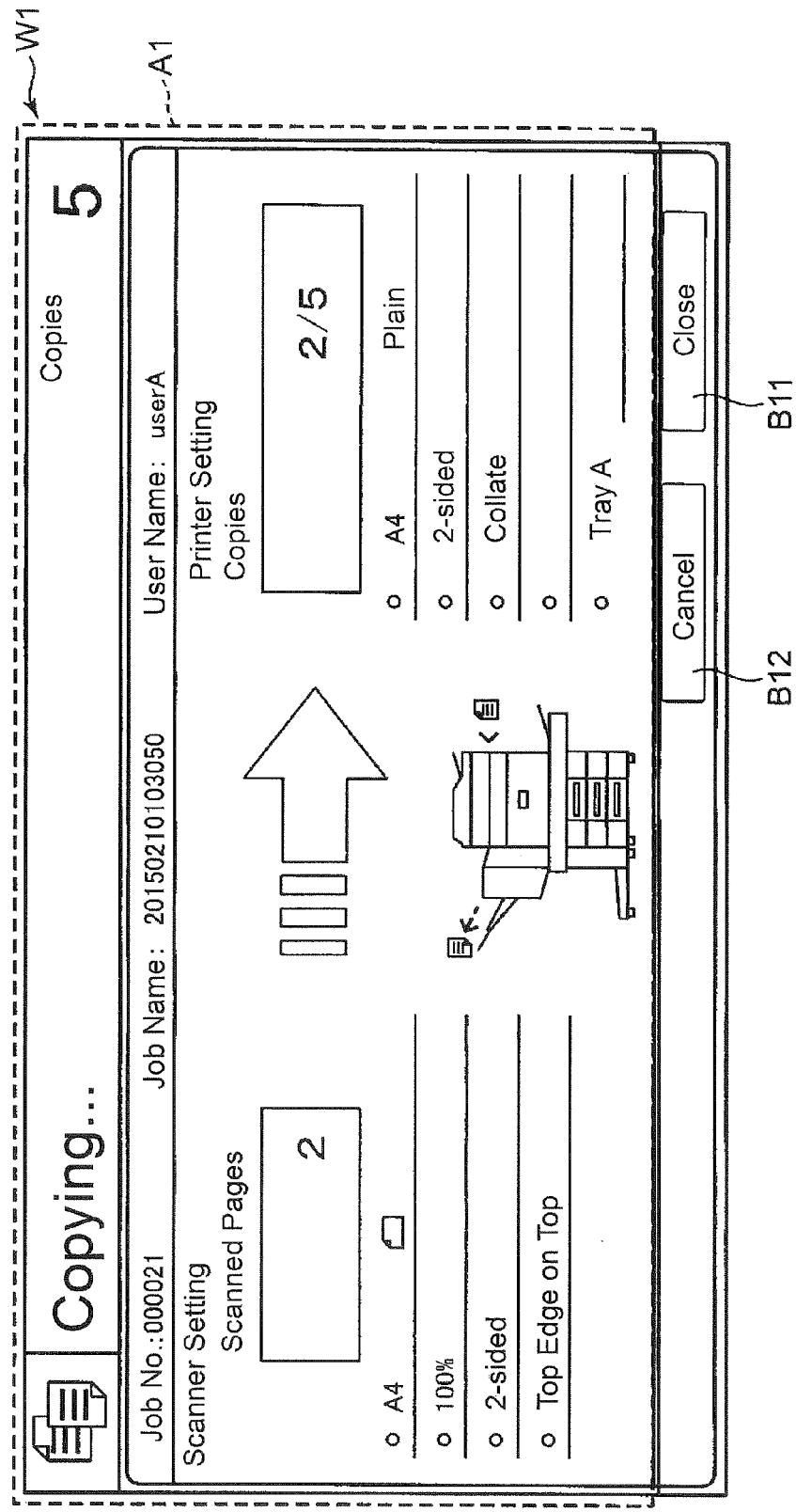
FIG. 2 illustrates an example of an execution screen of a first operation screen according to the one embodiment.

The status display 15 displays an execution screen W1 (a first operation screen) corresponding to the job in execution by the execution unit 14 on the display 41. FIG. 2 illustrates an example of the execution screen W1 according to one embodiment of the first operation screen according to the disclosure. As illustrated in FIG. 2, the execution screen W1 includes a display field A1 (a first display field), a close button B11, and a cancel button B12 (a first input portion).

The display field A1 displays the execution status of the job in execution by the execution unit 14. On the upper portion of the display field A1, a character string indicative of the type of the job included in the job in execution, the number of copies of the paper sheets included in the output condition, the job number corresponding to this job, the job name included in this job, the user name, and similar information are displayed.

In the example of FIG. 2, the character string indicative of "Copy Job," which is the type of the job included in the copy job in execution, "Copying . . . ," the number of copies of the paper sheets included in the output condition, "5," the job number, "000021," the job name, "20150210103050,"

and the user name, "User A," are displayed on the upper portion of the display field A1.

On the lower portion of the display field A1, the execution status of the job in execution is displayed. Specifically, the lower portion of the display field A1 is divided depending on the types of processes, which constitute the job in execution. The execution status of the process is displayed depending on the type of the process on the lower portion.

In the example of FIG. 2, the execution screen W1 displays the execution statuses of the two types of processes, the scanning process and the print process, which constitute the copy job in execution. Therefore, the lower portion of the display field A1 is divided into two areas. To the left at the lower portion of the display field A1, the number of scanned pages, "2," is displayed. The number of scanned pages indicates that the scanning process terminates scanning of images on the document on the second page. To the right at the lower portion of the display field A1, the number of copies, "2/5," is displayed. The number of copies indicates that the second print process, which outputs paper sheets of the second copy, is in execution among the five print processes, which output paper sheets of the five copies.

The close button B11 is a button that terminates the display of the execution screen W1 on the display 41. When pressing the close button B11, the status display 15 terminates the display of the execution screen W1 on the display 41.

The cancel button B12 is a button with which a cancel instruction, which cancels the execution of the job in execution, can be input. The operations when the cancel button B12 is pressed will be described later.

Now returning to FIG. 1, when the cancel instruction is input by pressing the cancel button B12 on the execution screen W1, the cancel unit 16 stores a job corresponding to this cancel instruction in the storage unit 8 as the cancel job. "The job corresponding to this cancel instruction" means the job whose execution status is displayed in the display field A1 in the execution screen W1. At this time, the cancel unit 16 makes process information correspond to this cancel job and stores the process information in the storage unit 8 among the one or more consecutive process constituting the cancel job stored in the storage unit 8. The process information indicates the process performed when the execution of this cancel job is canceled. The cancel unit 16 causes the execution unit 14 to cancel the execution of this cancel job.

FIG. 3 illustrates an example of the cancel jobs stored in the storage unit 8. Specifically, as illustrated in FIG. 3, the storage unit 8 includes a cancel job table JT. The cancel job table JT stores the cancel jobs. The cancel job table JT can make the job number, an accepted time, the cancel job, and the process information correspond to one another and store them. The job number corresponds to the cancel job. The accepted time corresponds to the cancel job.

For example, assume that, by pressing the cancel button B12 in the execution screen W1, which is illustrated in FIG. 2, the cancel instruction is input. In this case, as illustrated in FIG. 3, the cancel unit 16 stores the job number, "000021," and the accepted time, "10:31," corresponding to the copy job in execution, this copy job, and the process information, "2/5 Printed," in the cancel job table JT. The process information "2/5 Printed" indicates that after terminating the scanning process, in the five print processes continuous from the scanning process, the second print process has been performed.

Similarly, FIG. 3 illustrates an example where the cancel instruction is input during execution of the scanning process constituting the scan job corresponding to the job number, "000032," and the accepted time, "15:31." Then, the cancel job table JT stores this scan job as the cancel job.

Further, assume the case where the cancel instruction is input in a job status confirmation screen W2, which will be described later, while any of the two print processes, which constitute the print job corresponding to the job number "000043" and the accepted time "17:00," are not performed. FIG. 3 illustrates an example where the cancel unit 16 stores this print job as the cancel job in the cancel job table JT. Since any the two print processes, which constitute this print job, are not performed, the cancel job table JT stores the process information indicative of the status of zeroth print process being in execution, "0/2 Printed."

Now returning to FIG. 1, the list display 17 displays the job status confirmation screen (the second operation screen), which ensures an operation to perform the cancel job again, on the display 41.

Figure 4:
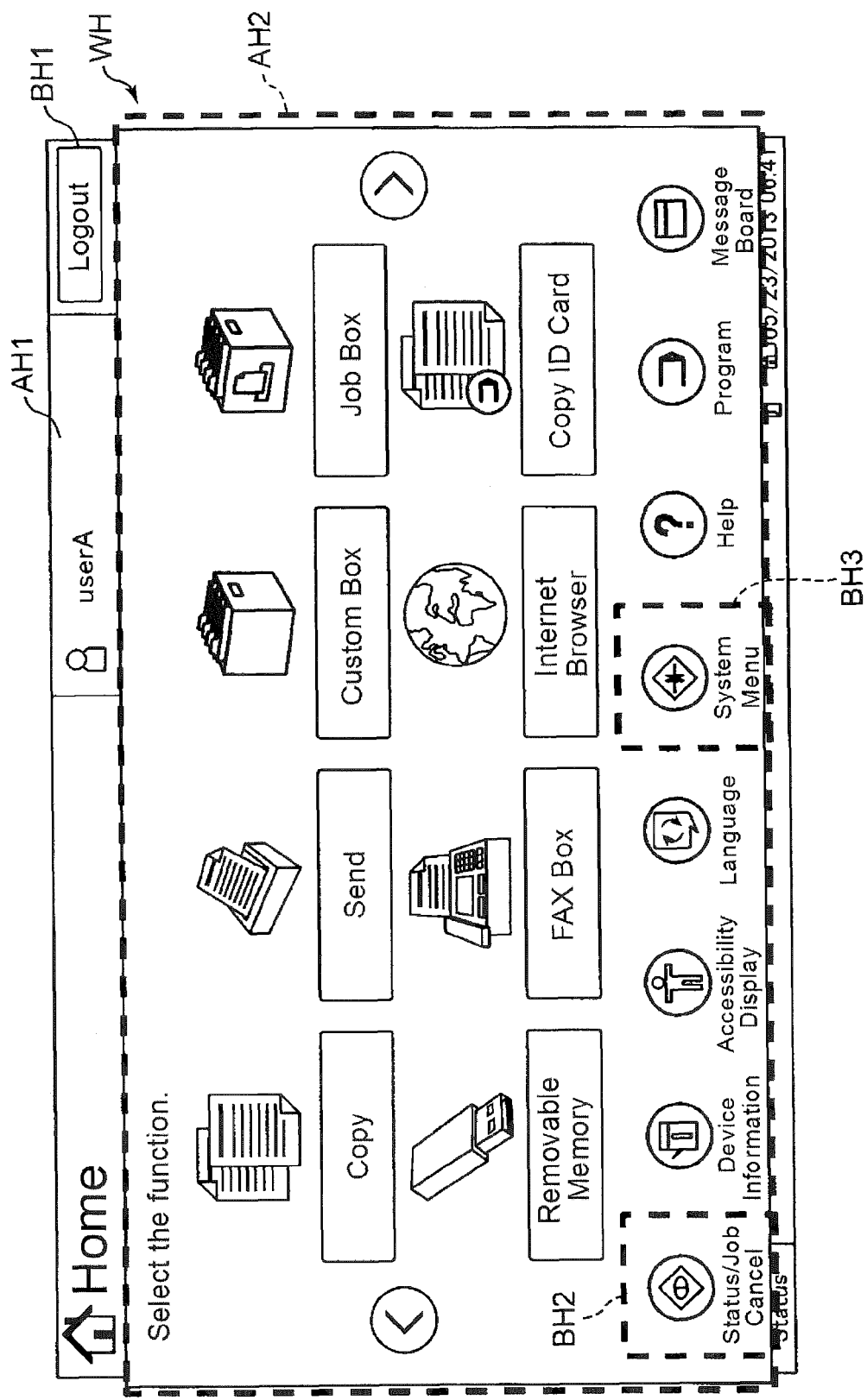
FIG. 4 illustrates an example of a home screen.

Specifically, immediately after the login managing unit 12 permits the user's login and when the display of each operation screen on the display 41 terminates, the control unit 10 displays a home screen WH, which is illustrated in FIG. 4, on the display 41. FIG. 4 illustrates an example of the home screen WH. As illustrated in FIG. 4, the home screen WH includes a user name display field AH1, a logout button BH1, and a menu display field AH2.

The user name display field AH1 displays the user name corresponding to the login user. In the example of FIG. 4, the user name display field AH1 displays the user name corresponding to the login user, "User A." The logout button BH1 is a button with which a logout instruction can be input. The logout instruction causes the login managing unit 12 to log out the login user. The menu display field AH2 displays a plurality of buttons to display the plurality of respective operation screens. The menu display field AH2 displays a status confirmation button BH2, a button BH3, or a similar button. The status confirmation button BH2 displays the job status confirmation screen W2, which will be described later. The button BH3 displays a system settings screen.

Figure 5:
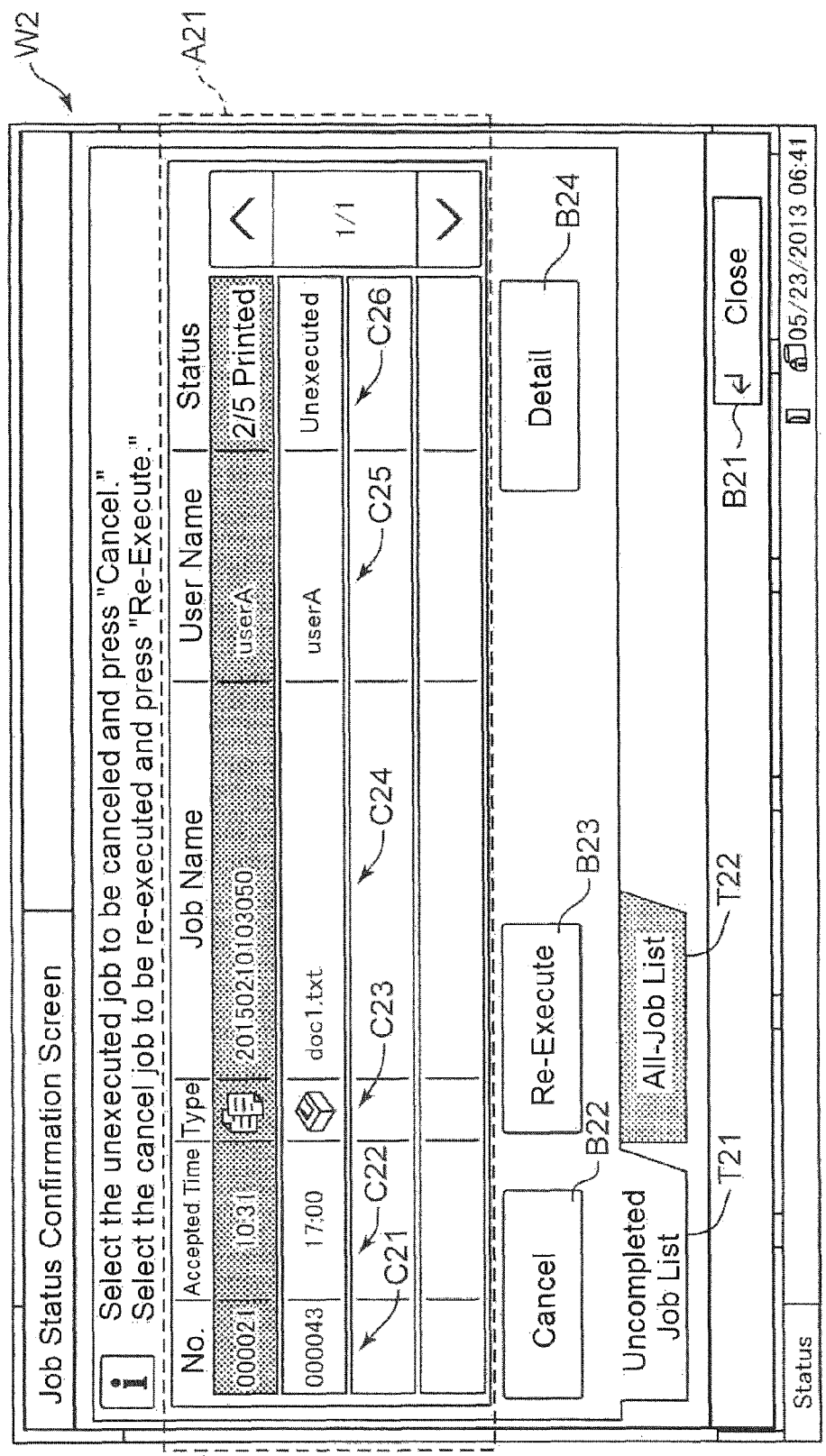
FIG. 5 illustrates an example of a job status confirmation screen of a second operation screen according to the one embodiment.

When pressing the status confirmation button BH2, the list display 17 displays the job status confirmation screen W2, which is illustrated in FIG. 5, on the display 41. FIG. 5 illustrates an example of the job status confirmation screen W2 according to one embodiment of the second operation screen according to the disclosure. As illustrated in FIG. 5, the job status confirmation screen W2 includes an uncompleted job list tab T21, an all-job list tab T22, and a close button B21.

The uncompleted job list tab T21 is a tab key with which an uncompleted job display instruction can be input. The uncompleted job display instruction is an instruction that causes uncompleted jobs input by the login user among the uncompleted jobs to be selectably displayed in a list. The uncompleted jobs are jobs that have not been performed yet by the execution unit 14. The uncompleted job includes the cancel job stored in the storage unit 8 and unexecuted jobs. The unexecuted jobs are jobs that have not been performed yet by the execution unit 14.

When pressing the uncompleted job list tab T21, the list display 17 displays a selection display field A21, a cancel button B22, a re-execute button B23 (a second input portion), and a detail button B24 in the job status confirmation screen W2.

The selection display field A21 selectably displays the uncompleted jobs in a list. The selection display field A21 includes a job number display field C21, an accepted time display field C22, a job type display field C23, a job name display field C24, a user name display field C25, and a status display field C26.

The job number display field C21 displays the job numbers corresponding to the uncompleted jobs input by the login user. The accepted time display field C22 displays the accepted times corresponding to the uncompleted jobs input by the login user. The job type display field C23 displays icons indicative of the types of jobs included in the uncompleted jobs input by the login user. The job name display field C24 displays the job names included in the uncompleted jobs input by the login user. The user name display field C25 displays the user names included in the uncompleted jobs input by the login user.

When the display-target uncompleted job is the cancel job, the status display field C26 displays the process information made correspond to this uncompleted job and stored in the storage unit 8. Meanwhile, when the display-target uncompleted job is the unexecuted job, the storage unit 8 does not store this uncompleted job as the cancel job. In view of this, when the display-target uncompleted job is the unexecuted job, the status display field C26 displays the process information, "Unexecuted."

FIG. 5 illustrates the example where the selection display field A21 displays the copy job as the cancel job input by this user and the print job as the unexecuted job in a list when the login user is a user corresponding to the user name, "User A." This copy job is illustrated in FIG. 3 as an example.

The job number display field C21 for the copy job displays the job number corresponding to this copy job, "000021." The accepted time display field C22 displays the accepted time corresponding to this copy job, "10:31." The job type display field C23 displays an icon indicative of the type of the job included in this copy job, "Copy Job." The job name display field C24 displays the job name included in this copy job, "20150210103050." The user name display field C25 displays the user name, "User A." The status display field C26 displays the process information made correspond to this copy job and stored in the cancel job table JT, "2/5 Printed."

Similarly, the job number display field C21 for the print job displays the job number corresponding to this print job, "000043." The accepted time display field C22 displays the accepted time, "17:00." The job type display field C23 displays an icon indicative of the type of the job included in this print job, "Print Job." The job name display field C24 displays the job name included in this print job, "doc1.txt." The user name display field C25 displays the user name included in this print job, "User A." Since this print job is the unexecuted job, the status display field C26 displays the process information, "Unexecuted."

The cancel button B22 is a button with which the cancel instruction, which cancels the execution of the unexecuted job selected in the selection display field A21, can be input. The storage unit 8 has already stored the cancel job displayed in the selection display field A21 as the cancel job. In view of this, when selecting the cancel job in the selection display field A21, the list display 17 disables the cancel button B22 to be pressed (grayed).

When the cancel instruction is input by pressing the cancel button B22, similar to the case where the cancel instruction is input using the cancel button B12 in the execution screen W1, the cancel unit 16 stores the unexecuted job corresponding to this input cancel instruction in the storage unit 8 as the cancel job. The unexecuted job corresponding to the cancel instruction is the unexecuted job selected in the selection display field A21. Then, the cancel unit 16 causes the execution unit 14 to cancel the execution of this unexecuted job.

For example, assume that the print job illustrated in FIG. 5 as an example is selected and then the cancel button B22 is pressed. Also assume that this print job performs the print process twice. In this case, similar to the case where the cancel instruction is input using the cancel button B12 in the execution screen W1, as illustrated in FIG. 3 as an example, the cancel unit 16 stores this print job in the storage unit 8 as the cancel job. In this case, among the twice print processes constituting this print job, the cancel unit 16 stores the process information indicative of the status of no execution of the processes, "0/2 Printed."

The re-execute button B23 is a button with which a recovery instruction can be input. The recovery instruction causes the execution unit 14 to perform the cancel job selected in the selection display field A21. The execution unit 14 performs the unexecuted job displayed in the selection display field A21 sometime. In view of this, when the unexecuted job is selected in the selection display field A21, the list display 17 disables the re-execute button B23 to be pressed (grayed). The operations when pressing the re-execute button B23 will be described later.

The detail button B24 is a button that displays the execution condition included in the uncompleted job selected in the selection display field A21 in a dialogue (not illustrated).

The all-job list tab T22 is a tab key that ensures an input of an all-job display instruction. The all-job display instruction displays all jobs accepted by the job accepting unit 13 in the job status confirmation screen W2 in a list. When pressing the all-job list tab T22, the list display 17 displays all the jobs accepted by the job accepting unit 13 in a list in the job status confirmation screen W2.

The close button B21 is a button that terminates the display of the job status confirmation screen W2 on the display 41. When pressing the close button B21, the list display 17 terminates the display of the job status confirmation screen W2 on the display 41.

Now returning to FIG. 1, when the recovery instruction is input by pressing the re-execute button B23 in the job status confirmation screen W2, the recovery control unit 18 causes the execution unit 14 to perform the cancel job corresponding to this recovery instruction. "The cancel job corresponding to this recovery instruction" means a cancel job selected in the selection display field A21. The recovery control unit 18 deletes this cancel job from the storage unit 8.

When the recovery control unit 18 causes the execution unit 14 to perform the cancel job corresponding to the recovery instruction, the recovery control unit 18 acquires the process information stored made correspond to this cancel job in the storage unit 8. The recovery control unit 18 causes the execution unit 14 to perform processes after the process indicated by this acquired process information.

For example, assume that the copy job illustrated in FIG. 5 as an example is selected, the re-execute button B23 is pressed, and the recovery instruction is input. In this case, the recovery control unit 18 acquires the process information made correspond to the copy job corresponding to this recovery instruction and stored in the storage unit 8, "2/5 Printed." In this case, the recovery control unit 18 causes the execution unit 14 to perform processes after the second print process among the five print processes constituting this copy job.

The recovery control unit 18 deletes this copy job, the job number made correspond to this copy job, the accepted time, and the process information from the cancel job table JT. Thus, the recovery control unit 18 deletes this copy job as the cancel job from the storage unit 8.

Assume that, by pressing the cancel button B22 in the job status confirmation screen W2, the print job illustrated in FIG. 5 as an example is stored in the storage unit 8 as the cancel job as described above. Afterwards, assume that the selection display field A21 displays this print job as the cancel job, this print job is selected, and then the re-execute button B23 is pressed.

In this case, the recovery control unit 18 acquires the process information made correspond to this print job and stored in the storage unit 8, "0/2 Printed." The recovery control unit 18 causes the execution unit 14 to perform processes after the zeroth print process among the two print processes constituting this print job. That is, after the unexecuted job is stored as the cancel job, when the recovery control unit 18 causes the execution unit 14 to perform this cancel job again, the recovery control unit 18 causes the execution unit 14 to perform all processes constituting this cancel job.

Now returning to FIG. 1, the deletion processing unit 19 performs a deletion process at a predetermined timing. The deletion process deletes the cancel job stored in the storage unit 8. In the deletion process, the deletion processing unit 19 deletes the cancel job, the job number made correspond to this cancel job, the accepted time, and the process information from the cancel job table JT. Thus, the deletion processing unit 19 deletes this cancel job stored in the storage unit 8.

The timing accepting unit 20 accepts an input of a timing by the user at which the deletion processing unit 19 performs the deletion process. Hereinafter, the timing at which the deletion processing unit 19 performs the deletion process is referred to as a deletion timing.

Figure 6:
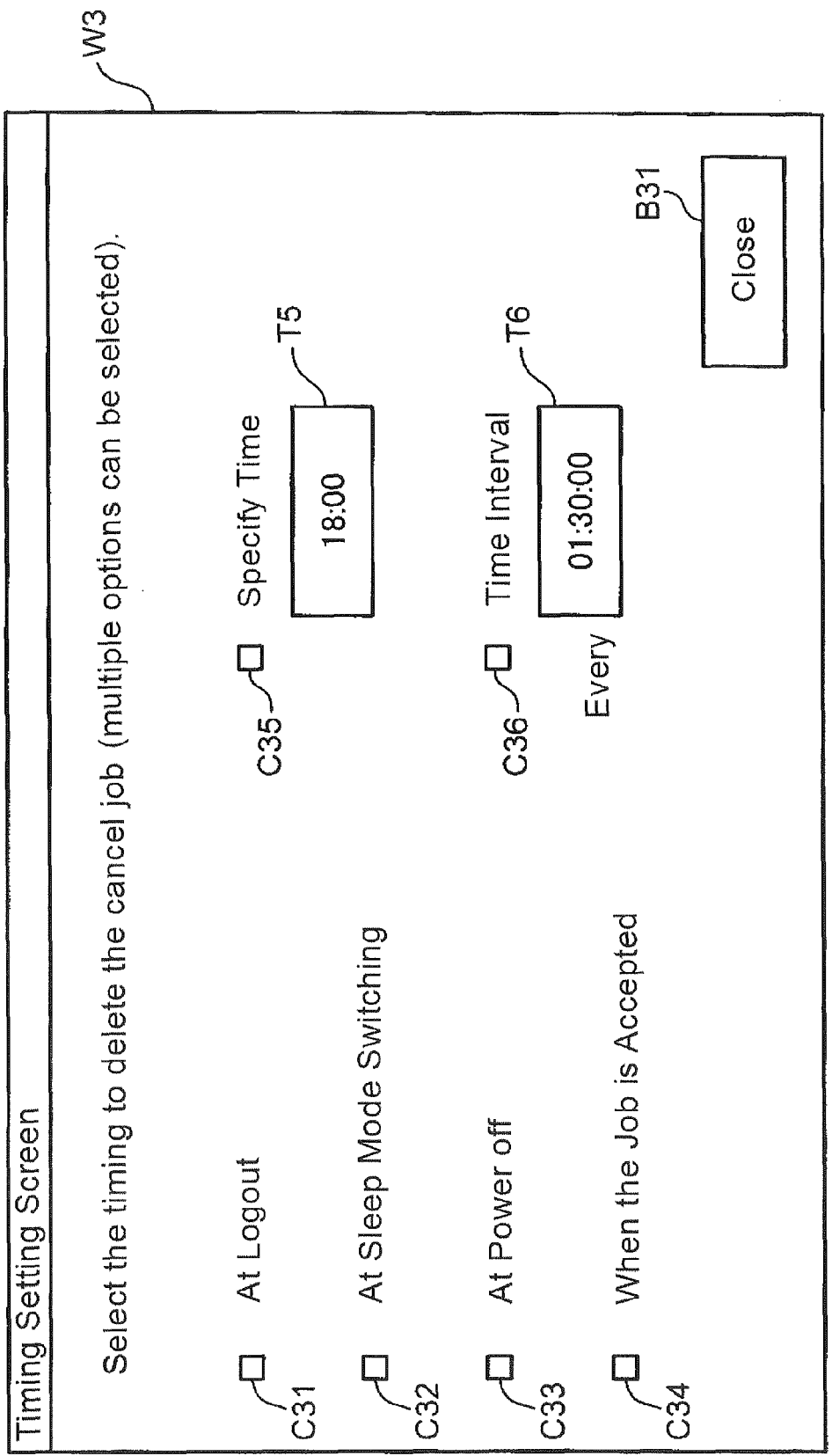
FIG. 6 illustrates an example of a timing setting screen.

The following describes details of the deletion processing unit 19 and the timing accepting unit 20. FIG. 6 illustrates an example of a timing setting screen W3. Specifically, when pressing the button BH3, which is displayed in the menu display field AH2 in the home screen WH (FIG. 4), the control unit 10 displays the system settings screen on the display 41. The system settings screen includes a timing setting button. The timing setting button displays the timing setting screen W3. When pressing the timing setting button, the timing accepting unit 20 displays the timing setting screen W3, which is illustrated in FIG. 6.

As illustrated in FIG. 6, the timing setting screen W3 includes six check boxes C31 to C36 and a close button B31. Whenever the user performs a touch operation, the check boxes C31 to C36 each switch the state between the selected state and the unselected state. Thus, among the six check boxes C31 to C36, the plurality of check boxes are selectable.

The timing setting screen W3 includes a time entry field T5 and a time interval entry field T6. The entry field T5 corresponds to the check box C35. The entry field T6 corresponds to the check box C36. FIG. 6 illustrates an example where "18:00" indicative of time of 18:00 is input to the entry field T5. FIG. 6 illustrates an example where "01:30:00" indicative of 1 hour, 30 minutes, and 00 seconds is input to the entry field T6.

To the check box C31, a first instruction can be input. The first instruction includes the deletion timing when the login managing unit 12 causes the login user to log out. When selecting the check box C31, the timing accepting unit 20 accepts the input of the first instruction. In this case, the deletion processing unit 19 performs the deletion process at the timing at which the login managing unit 12 causes the login user to log out. Hereinafter, the deletion process performed by the deletion processing unit 19 at the timing of the login managing unit 12 causing the login user to log out is referred to as a first deletion process.

To the check box C32, a second instruction can be input. The second instruction includes a timing when the mode switching unit 11 switches the electric power mode to the sleep mode in the deletion timing. When selecting the check box C32, the timing accepting unit 20 accepts the input of the second instruction. In this case, the deletion processing unit 19 performs the deletion process at the timing when the electric power mode is switched to the sleep mode. Hereinafter, the deletion process performed by the deletion processing unit 19 at the timing when the electric power mode switches to the sleep mode is referred to as a second deletion process.

To the check box C33, a third instruction can be input. The third instruction includes a timing at which the switch unit 9 is switched to the off-state, that is, a timing at which the switch unit 9 cuts off the supply of electric power to the multi-functional peripheral 1, in the deletion timing. When selecting the check box C33, the timing accepting unit 20 accepts the input of the third instruction. In this case, the deletion processing unit 19 performs the deletion process at the timing when the switch unit 9 cuts off the supply of electric power to the multi-functional peripheral 1. Hereinafter, the deletion process performed by the deletion processing unit 19 at the timing when the switch unit 9 cuts off the supply of electric power to the multi-functional peripheral 1 is referred to as a third deletion process.

To the check box C34, a fourth instruction can be input. The fourth instruction includes a timing at which the job accepting unit 13 accepts the job in the deletion timing. When selecting the check box C34, the timing accepting unit 20 accepts the input of the fourth instruction. In this case, the deletion processing unit 19 performs the deletion process at the timing when the job accepting unit 13 accepts the job. Hereinafter, the deletion process performed by the deletion processing unit 19 at the timing when the job accepting unit 13 accepts the job is referred to as a fourth deletion process.

To the check box C35, a fifth instruction can be input. The fifth instruction includes time input to the entry field T5 by the user in the deletion timing. When inputting the time to the entry field T5 and selecting the check box C35, the timing accepting unit 20 accepts the time input to the entry field T5 and the input of the fifth instruction. In this case, the deletion processing unit 19 performs the deletion process at the time input to the entry field T5. Hereinafter, the deletion process performed by the deletion processing unit 19 at the time input to the entry field T5 is referred to as a fifth deletion process.

To the check box C36, a sixth instruction can be input. The sixth instruction is an instruction that includes a plurality of timings chronologically arrayed from a predetermined reference time point at the time interval input to the entry field T6 by the user in the deletion timing. The reference time point is determined to, for example, when the control unit 10 starts operating by the supply of power supply voltage, when the mode switching unit 11 switches the electric power mode to the normal mode, or similar time.

When inputting the time interval to the entry field T6 and selecting the check box C36, the timing accepting unit 20 accepts the time interval input to the entry field T6 and the input of the sixth instruction. In this case, the deletion processing unit 19 performs the deletion process at the plurality of timings chronologically arrayed from the predetermined reference time point at the time interval input to the entry field T6. That is, the deletion processing unit 19 regularly performs the deletion process whenever the time interval passes from the reference time. Hereinafter, the deletion process performed by the deletion processing unit 19 whenever the time interval input to the entry field T6 passes from the reference time point is referred to as a sixth deletion process. The details of the first to the sixth deletion processes will be described later.

The close button B31 is a button that terminates the display of the timing setting screen W3 on the display 41. When pressing the close button B31, the timing accepting unit 20 terminates the display of the timing setting screen W3 on the display 41.

Figure 7:
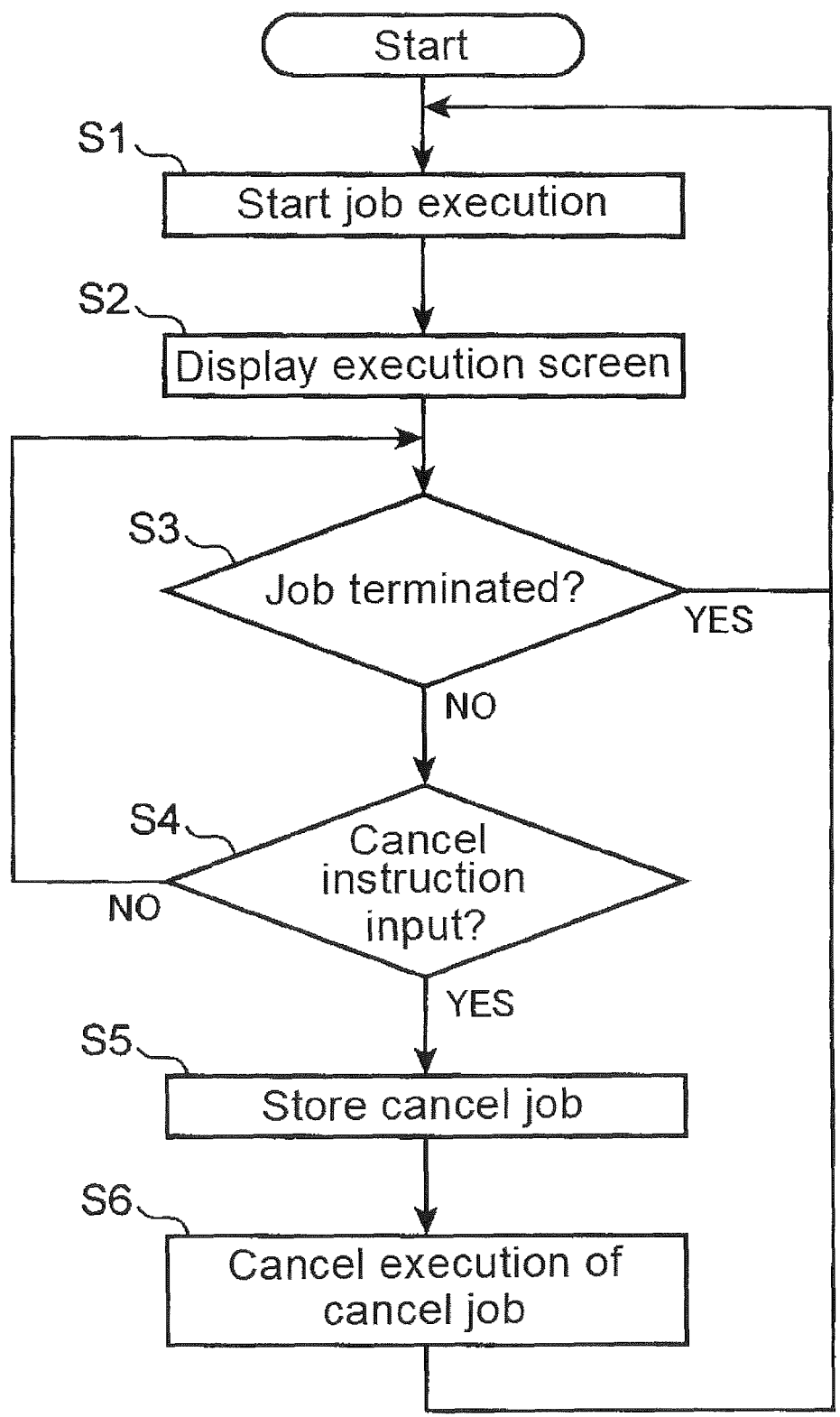
FIG. 7 illustrates operations to cancel execution of a job in execution.

The following describes operations to cancel the execution of the job in execution. FIG. 7 illustrates the operations to cancel the execution of the job in execution.

As illustrated in FIG. 7, when the execution unit 14 starts performing the job accepted by the job accepting unit 13 (S1), the status display 15 displays the execution screen W1 (FIG. 2) corresponding to this job in execution on the display 41 (S2). At this time, the status display 15 displays the execution status of this job in execution in the display field A1 in the execution screen W1.

Assume that when this job in execution is not terminated (S3: NO), the cancel button B12 in the execution screen W1 is pressed to input the cancel instruction (S4: YES).

In this case, the cancel unit 16 sets this job in execution as the cancel job. The cancel unit 16 stores the job number and the accepted time corresponding to this cancel job, this cancel job, and the process information in the cancel job table JT. Thus, the cancel unit 16 stores this job in execution in the storage unit 8 as the cancel job (S5). Then, the cancel unit 16 causes the execution unit 14 to cancel the execution of this job (S6). Thereafter, the process returns to Step S1 to start the execution of the next job accepted by the job accepting unit 13. Thus, the processes after Step S2 are performed.

Figure 8:
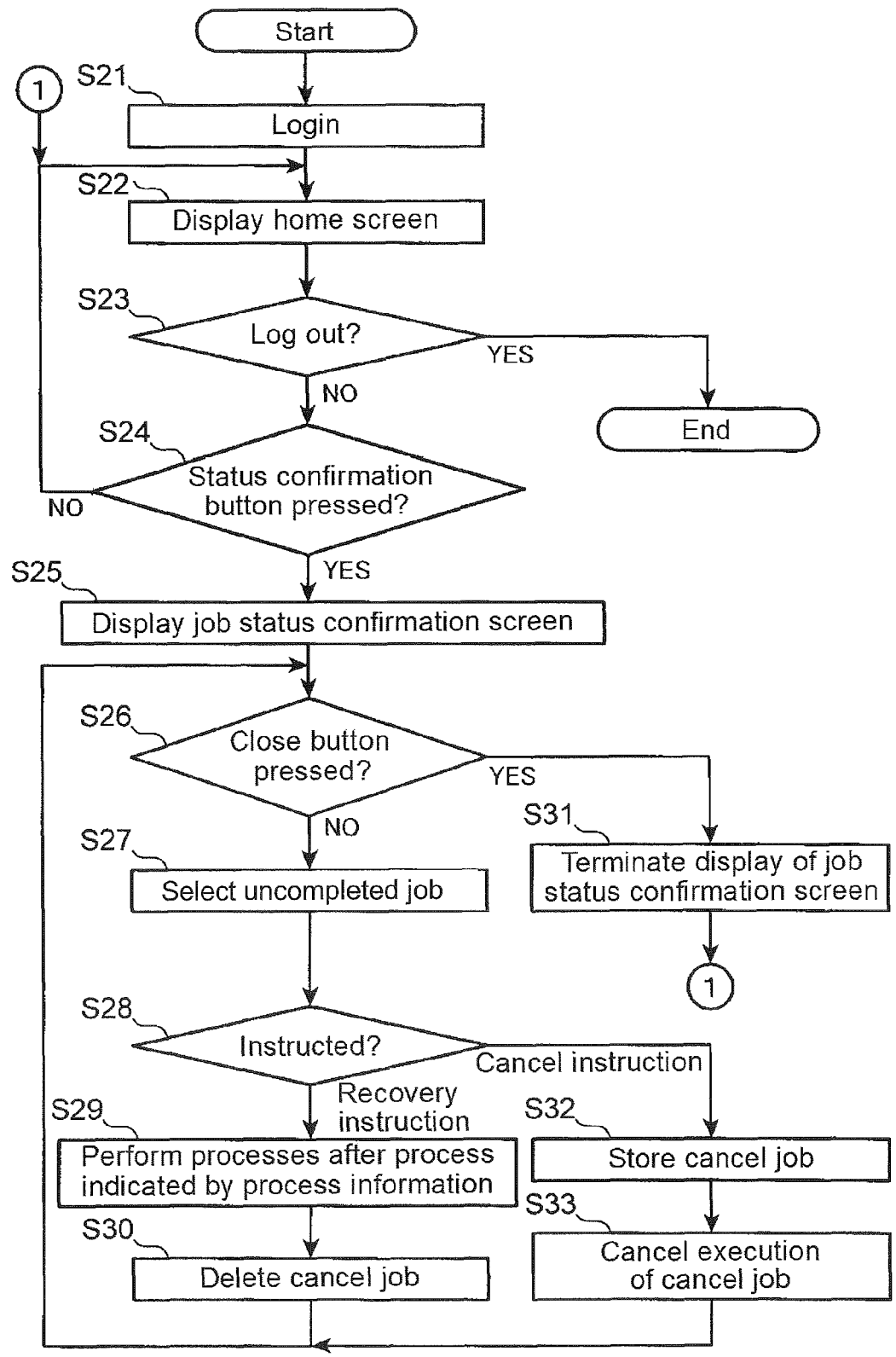
FIG. 8 illustrates operations to perform a cancel job again.

When this job in execution terminates (S3: YES), the process returns to Step S1 to start the execution of the next job accepted by the job accepting unit 13. Thus, the processes after Step S2 are performed Next, the following describes operations to perform the cancel job again. FIG. 8 illustrates the operations to perform the cancel job again.

As illustrated in FIG. 8, when the login managing unit 12 permits the user to log in (S21), the control unit 10 displays the home screen WH (FIG. 4) on the display 41 (S22). While the login managing unit 12 does not cause the login user to log out (S23: NO), the processes after Step S24 are performed.

When pressing the status confirmation button BH2 in the home screen WH (S24: YES), the list display 17 displays the job status confirmation screen W2 (FIG. 5) on the display 41 (S25). At the beginning of displaying the job status confirmation screen W2, the list display 17 keeps the uncompleted job list tab T21 pressed. Then, the list display 17 displays the uncompleted job input by the login user in the selection display field A21 and displays the cancel button B22, the re-execute button B23, the detail button B24, and the close button B21.

Assume that, when the close button B21 is not pressed (S26: NO), after a cancel job is selected among the uncompleted jobs displayed in the selection display field A21 (S27), the re-execute button B23 is pressed and the recovery instruction is input (S28; recovery instruction).

In this case, the recovery control unit 18 acquires the process information stored in the cancel job table JT made correspond to the cancel job corresponding to this recovery instruction and causes the execution unit 14 to perform the processes after the process indicated by this process information (S29). Then, the recovery control unit 18 deletes this cancel job, the job number corresponding to this cancel job, the accepted time, and the process information from the cancel job table JT. Thus, the recovery control unit 18 deletes this cancel job from the storage unit 8 (S30). Thereafter, the processes after Step S26 are performed.

Meanwhile, assume that, after an unexecuted job is selected among the uncompleted jobs displayed in the selection display field A21 (S27), the cancel button B22 is pressed, and the cancel instruction is input (S28; cancel instruction).

In this case, the cancel unit 16 makes the unexecuted job corresponding to this cancel instruction, the job number and the accepted time corresponding to this unexecuted job, and the process information indicative of the status of no execution of the processes among one or more consecutive process constituting this unexecuted job correspond to one another. The cancel unit 16 stores them in the cancel job table JT. Thus, the cancel unit 16 stores the unexecuted job corresponding to this cancel instruction in the storage unit 8 as the cancel job (S32). Then, the cancel unit 16 causes the execution unit 14 to cancel the execution of this cancel job (S33). Thereafter, the processes after Step S26 are performed.

When pressing the close button B21 (S26: YES), the list display 17 terminates the display of the job status confirmation screen W2 on the display 41 (S31). Thereafter, the processes after Step S22 are performed.

Figure 9:
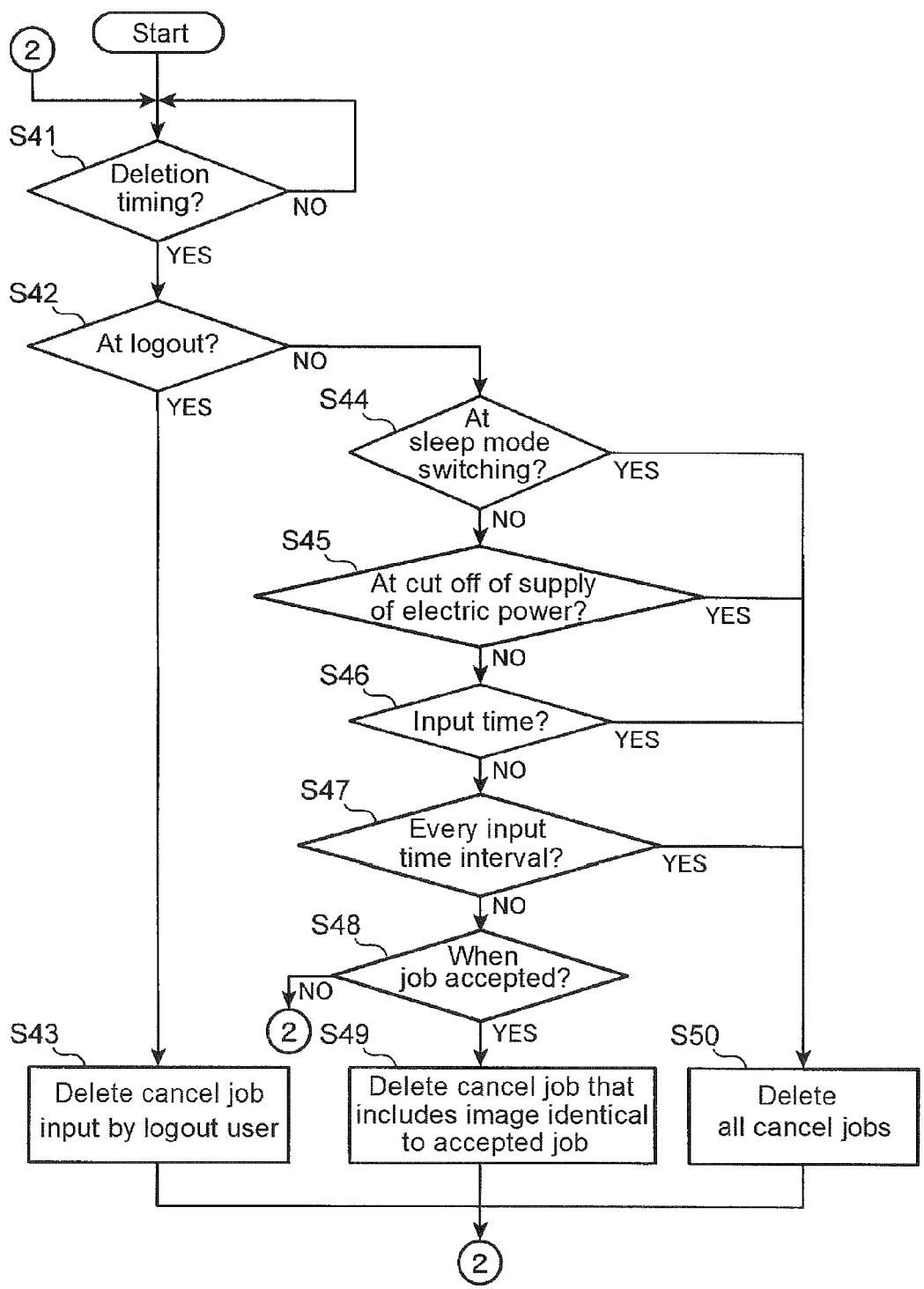
FIG. 9 illustrates operations to delete a cancel job stored in the storage unit.

Next, the following describes operations to delete the cancel job stored in the storage unit 8. FIG. 9 illustrates the operations to delete the cancel job stored in the storage unit 8.

As illustrated in FIG. 9, when the deletion timing accepted by the timing accepting unit 20 has come (S41: YES) and this deletion timing is the timing when the login managing unit 12 causes the login user to log out (S42: YES), the deletion processing unit 19 performs the first deletion process. In the first deletion process, the deletion processing unit 19 deletes the cancel job input by the user who has logged out among the cancel jobs stored in the storage unit 8 (S43). Thereafter, the processes after Step S41 are performed.

For example, as illustrated in FIG. 3, assume that, when the storage unit 8 stores three cancel jobs, the login user corresponding to the user name, "User A," logs out and the deletion processing unit 19 performs the first deletion process.

In this case, the deletion processing unit 19 deletes the copy job corresponding to the job number, "000021," input by the user corresponding to the user name "User A," and the job number, the accepted time, and the process information corresponding to this copy job from the cancel job table JT. The deletion processing unit 19 deletes the print job corresponding to the job number, "000043," input by the user corresponding to the user name, "User A," and the job number, the accepted time, and the process information corresponding to this print job from the cancel job table JT. Thus, the deletion processing unit 19 deletes the copy job and the print job input by the user corresponding to the user name, "User A," from the storage unit 8.

When the deletion timing is a timing at which the mode switching unit 11 switches the electric power mode to the sleep mode (S42: NO and S44: YES), the deletion processing unit 19 performs the second deletion process. In the second deletion process, the deletion processing unit 19 deletes all the cancel jobs stored in the cancel job table JT and the job numbers, the accepted times, and the process information corresponding to the all cancel jobs. Thus, the deletion processing unit 19 deletes the all cancel jobs stored in the storage unit 8 (S50). Thereafter, the processes after Step S41 are performed.

When the deletion timing is a timing at which the switch unit 9 cuts off the supply of the electric power to the multi-functional peripheral 1 (S42: NO, S44: NO, and S45: YES), the deletion processing unit 19 performs the third deletion process. In the third deletion process, the deletion processing unit 19 performs Step S50 using electric power accumulated in an electrical element, which can accumulate electricity, such as a capacitor in the control unit 10.

When the deletion timing is time input by the user to the timing setting screen W3 (S42: NO, S44: NO, S45: NO, and S46: YES), the deletion processing unit 19 performs the fifth deletion process. In the fifth deletion process, the deletion processing unit 19 performs Step S50.

When the deletion timing is any of timings among the plurality of timings chronologically arrayed from the reference time point at the time interval input by the user to the timing setting screen W3 (S42: NO, S44: NO, S45: NO, S46: NO, and S47: YES), the deletion processing unit 19 performs the sixth deletion process. In the sixth deletion process, the deletion processing unit 19 performs Step S50.

When the deletion timing is a timing at which the job accepting unit 13 accepts the job (S42: NO, S44: NO, S45: NO, S46: NO, S47: NO, and S48: YES), the deletion processing unit 19 performs the fourth deletion process.

Only when the accepted job is the print job, in the fourth deletion process, the deletion processing unit 19 deletes the print job whose formation-target image is identical to the formation (output)-target image of this accepted print job among the cancel jobs stored in the storage unit 8 (S49). Thereafter, the processes after Step S41 are performed.

Specifically, when the accepted job is the print job in the fourth deletion process, the deletion processing unit 19 acquires the execution condition included in this print job and acquires the image data included in this acquired execution condition. Then, the deletion processing unit 19 deletes the print job that includes the image data identical to the acquired image data in the execution condition and the job number, the accepted time, and the process information corresponding to this print job stored in the cancel job table JT.

The job name included in the print job is, as described above, a file name of the electronic file formed of image data representing the target image formed on the paper sheet by the print process. In view of this, in the fourth deletion process, the deletion processing unit 19 may acquire the execution condition from the accepted print job and may delete the print job that includes the job name identical to the job name included in this acquired execution condition.

Thus, according to the configuration of the embodiment, when the execution of the job corresponding to the cancel instruction is canceled, the storage unit 8 stores this job as the cancel job. Then, the selection display field A21 in the job status confirmation screen W2 displays the cancel job stored in the storage unit 8.

When the user attempts to perform the canceled job again, this eliminates a labor of the re-input operation of this job from the beginning. The user only needs to select the cancel job displayed in the selection display field A21 in the job status confirmation screen W2 and input the recovery instruction with the re-execute button B23. Thus, this selected cancel job can be easily performed again.

When performing the canceled job again, the job performs the processes after the process performed when the execution of this job is canceled. Thus, compared with the case where the canceled job is performed again from the first process among the processes constituting this job, the processing time taken for this re-execution can be reduced.

The list display 17 displays the cancel job input by the login user in the selection display field A21.

Among the cancel jobs displayed in the selection display field A21, this ensures reducing a possibility of the login user incorrectly selecting a cancel job input by a user different from this login user. This ensures reducing a possibility of the login user incorrectly selecting the cancel job input by another user. This ensures reducing a possibility of re-execution of this incorrectly selected cancel job without permission of this other user.

The cancel jobs stored in the storage unit 8 are deleted at the predetermined timing. This does not delete cancel jobs with a low possibility of re-execution and keeps the cancel jobs stored in the storage unit 8. This ensures reducing a possibility of wastefully reducing an amount of data that can be stored in the storage unit 8.

The user can input the timing to cause the deletion processing unit 19 to perform the deletion process. This ensures causing the deletion processing unit 19 to perform the deletion process at the timing intended by the user.

When the electric power mode is switched to the sleep mode, the multi-functional peripheral 1 enters a state with the power consumption restrained. That is, in this case, a possibility of re-execution of the cancel jobs stored in the storage unit 8 is considered to be low.

With the configuration of the embodiment, at the timing when the electric power mode is switched to the sleep mode and therefore the possibility of re-execution of the cancel jobs stored in the storage unit 8 is considered to be low, the embodiment causes the deletion processing unit 19 to perform the deletion process. This ensures appropriately deleting the cancel jobs where the possibility of re-execution is considered to be low.

When the supply of electric power to the multi-functional peripheral 1 is cut off, the multi-functional peripheral 1 enters a state with the operations disabled soon. That is, in this case, a possibility of re-execution of the cancel jobs stored in the storage unit 8 is considered to be low.

With the configuration of the embodiment, at the timing when the supply of electric power to the multi-functional peripheral 1 is cut off and therefore the possibility of re-execution of the cancel jobs stored in the storage unit 8 is considered to be low, the embodiment causes the deletion processing unit 19 to perform the deletion process. This ensures appropriately deleting the cancel jobs where the possibility of re-execution is considered to be low.

When the print job whose formation-target image is identical to the image formed on the paper sheet by the image forming unit 7 included in the cancel job is accepted, the execution unit 14 performs this print job. Therefore, a possibility of re-execution of this cancel job is considered to be low.

With the configuration of the embodiment, at the timing when the print job whose formation-target image is identical to the image formed on the paper sheet by the image forming unit 7 included in the cancel job is accepted, and therefore a possibility of re-execution of this cancel job is considered to be low, the deletion processing unit 19 performs the deletion process to delete this cancel job. This ensures appropriately deleting the cancel jobs where the possibility of re-execution is considered to be low.

The following is considered. A possibility that the user logged out by the login managing unit 12 and therefore does not log in to the multi-functional peripheral 1 performs the cancel job input by himself/herself again is low.

With the configuration of the embodiment, at the timing when a possibility of re-execution of the cancel job input by the user logged out by the login managing unit 12 is considered to be low, the deletion processing unit 19 performs the deletion process to delete this cancel job. This ensures appropriately deleting the cancel jobs where the possibility of re-execution is considered to be low.

The embodiment is merely an example of the embodiment according to the disclosure and not intended to limit the disclosure to the embodiment. For example the following modifications of the embodiment may be employed.

(1) The timing setting screen W3 may not include the check box C31. The deletion processing unit 19 may not perform the first deletion process. The timing setting screen W3 may not include the check box C34. The deletion processing unit 19 may not perform the fourth deletion process.

(2) In the second deletion process, the third deletion process, the fifth deletion process, or the sixth deletion process, similar to Step S43, the deletion processing unit 19 may delete the cancel job input by the login user instead of Step S50.

(3) The timing setting screen W3 may not include the check box C33. The deletion processing unit 19 may not perform the third deletion process. The timing setting screen W3 may not include the check box C32. The deletion processing unit 19 may not perform the second deletion process.

(4) The control unit 10 may not operate as the timing accepting unit 20. The deletion timing may be predetermined irrespective of the user's input.

(5) The control unit 10 may not operate as the deletion processing unit 19. That is, the operations illustrated in FIG. 9 may be omitted.

(6) The list display 17 may additionally display uncompleted jobs input by a user other than the login user in a list in the selection display field A21.

(7) The cancel unit 16 may not store the process information in the cancel job table JT. Instead of Step S29, the recovery control unit 18 may cause the execution unit 14 to perform all the processes constituting the cancel job corresponding to the recovery instruction.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A job control device, comprising:
a display;
a storage circuit;
an execution circuit that performs a job;
a status display that displays a first operation screen on the display, the first operation screen including a first display field and a first input portion, the first display field displaying an execution status of a job in execution by the execution circuit, the first input portion being configured to receive a cancel instruction for canceling an execution of the job;
a cancel circuit that stores a job corresponding to the cancel instruction in the storage circuit as a cancel job and cancels the execution of the job by the execution circuit when the cancel instruction is input;
a recovery display that displays a second operation screen on the display, the second operation screen including a selection display field, a second input portion, and a cancel button, the selection display field selectably displaying the cancel jobs stored in the storage circuit and unexecuted jobs that have not been performed yet by the execution circuit, the second input portion being configured to receive a recovery instruction for performing the cancel job selected in the selection display field again, the cancel button being configured to receive a cancel instruction for canceling the unexecuted job selected in the selection display field; and
a recovery control circuit that causes the execution circuit to perform the cancel job corresponding to the recovery instruction when the recovery instruction is input,
wherein when the cancel job is selected in the selection display field, the recovery control circuit disables the cancel button to be pressed, and
when the unexecuted job is selected in the selection display field, the recovery control circuit disables the second input portion to be pressed.

2. The job control device according to claim 1,
wherein the cancel circuit makes process information correspond to the cancel job, the cancel circuit storing the process information in the storage circuit, the process information indicating a process performed when an execution of the cancel job is canceled among one or more consecutive process constituting the cancel job, and
when the recovery control circuit causes the execution circuit to perform the cancel job corresponding to the recovery instruction, the recovery control circuit causes the execution circuit to perform a process after a process indicated by the process information, the process information being stored made correspond to the cancel job in the storage circuit.

3. The job control device according to claim 1, further comprising
a login managing circuit that permits a user to log in and log out,
wherein the recovery display displays the cancel job input by the login user in the selection display field.

4. The job control device according to claim 1, further comprising
a deletion processing circuit that performs a deletion process at a predetermined timing, the deletion process deleting the cancel job stored in the storage circuit.

5. The job control device according to claim 4, further comprising
a timing accepting circuit that accepts an input of the timing by the user.

6. The job control device according to claim 4, further comprising
a mode switching circuit that switches an electric power mode between a sleep mode and a normal mode, the sleep mode restraining a power consumption by the job control device, the normal mode not restraining the power consumption,
wherein the deletion processing circuit performs the deletion process at a timing when the electric power mode is switched to the sleep mode.

7. The job control device according to claim 4, further comprising a switch that cuts off a supply of an electric power to the job control device, wherein the deletion processing circuit performs the deletion process at a timing when the switch cuts off the supply of the electric power.

8. The job control device according to claim 4, further comprising:

a job accepting circuit that accepts an input of the job; and an image output unit that outputs an image, wherein the deletion processing circuit deletes the cancel job when the job accepting circuit accepts an image output job in the deletion process, the image output job causing the image output unit to output the image, the cancel job causing the image output unit to output an image identical to an output-target image of the image output job.

9. The job control device according to claim 4, further comprising a login managing circuit that permits a user to log in and log out, wherein the deletion processing circuit performs the deletion process at a timing when the login managing circuit causes the user to log out, the deletion process deleting the cancel job input by the logout user.

10. A job control method that uses a display, a storage circuit, and an execution circuit that performs a job, the job control method comprising:

displaying a first operation screen on the display, the first operation screen including a first display field and a first input portion, the first display field displaying an execution status of a job in execution by the execution circuit, the first input portion being configured to receive a cancel instruction for canceling an execution of the job;

storing a job corresponding to the cancel instruction in the storage circuit as a cancel job and canceling the execution of the job by the execution circuit when the cancel instruction is input;

displaying a second operation screen on the display, the second operation screen including a selection display field, a second input portion, and a cancel button, the selection display field selectably displaying the cancel jobs stored in the storage circuit and unexecuted jobs that have not been performed yet by the execution circuit, the second input portion being configured to receive a recovery instruction for performing the cancel job selected in the selection display field again, the cancel button being configured to receive a cancel instruction for canceling the unexecuted job selected in the selection display field; and causing the execution circuit to perform the cancel job corresponding to the recovery instruction when the recovery instruction is input, wherein when the cancel job is selected in the selection display field, the recovery control circuit disables the cancel button to be pressed, and when the unexecuted job is selected in the selection display field, the recovery control circuit disables the second input portion to be pressed.

11. A non-transitory computer-readable recording medium storing a job control program for controlling a job control device including a display, a storage circuit, and an execution circuit performing a job, the job control program causing the job control device to function as:

a status display that displays a first operation screen on the display, the first operation screen including a first display field and a first input portion, the first display field displaying an execution status of a job in execution by the execution circuit, the first input portion being configured to receive a cancel instruction for canceling the execution of the job;

a cancel circuit that stores a job corresponding to the cancel instruction in the storage circuit as a cancel job and cancels the execution of the job by the execution circuit when the cancel instruction is input;

a recovery display that displays a second operation screen on the display, the second operation screen including a selection display field, a second input portion, and a cancel button, the selection display field selectably displaying the cancel jobs stored in the storage circuit and unexecuted jobs that have not been performed yet by the execution circuit, the second input portion being configured to receive a recovery instruction for performing the cancel job selected in the selection display field again, the cancel button being configured to receive a cancel instruction for canceling the unexecuted job selected in the selection display field; and a recovery control circuit that causes the execution circuit to perform the cancel job corresponding to the recovery instruction when the recovery instruction is input, wherein when the cancel job is selected in the selection display field, the recovery control circuit disables the cancel button to be pressed, and when the unexecuted job is selected in the selection display field, the recovery control circuit disables the second input portion to be pressed.

* * * * *